June 18, 1957   J. BUSCHBACH   2,795,859
APPARATUS FOR TESTING THE ACCURACY OF WHEEL
ALIGNMENT MEASURING EQUIPMENT
Filed Jan. 24, 1955   3 Sheets-Sheet 1

INVENTOR.
JAKE BUSCHBACH
BY
Bertha L. McGregor
ATTORNEY

June 18, 1957     J. BUSCHBACH     2,795,859
APPARATUS FOR TESTING THE ACCURACY OF WHEEL
ALIGNMENT MEASURING EQUIPMENT
Filed Jan. 24, 1955     3 Sheets-Sheet 2
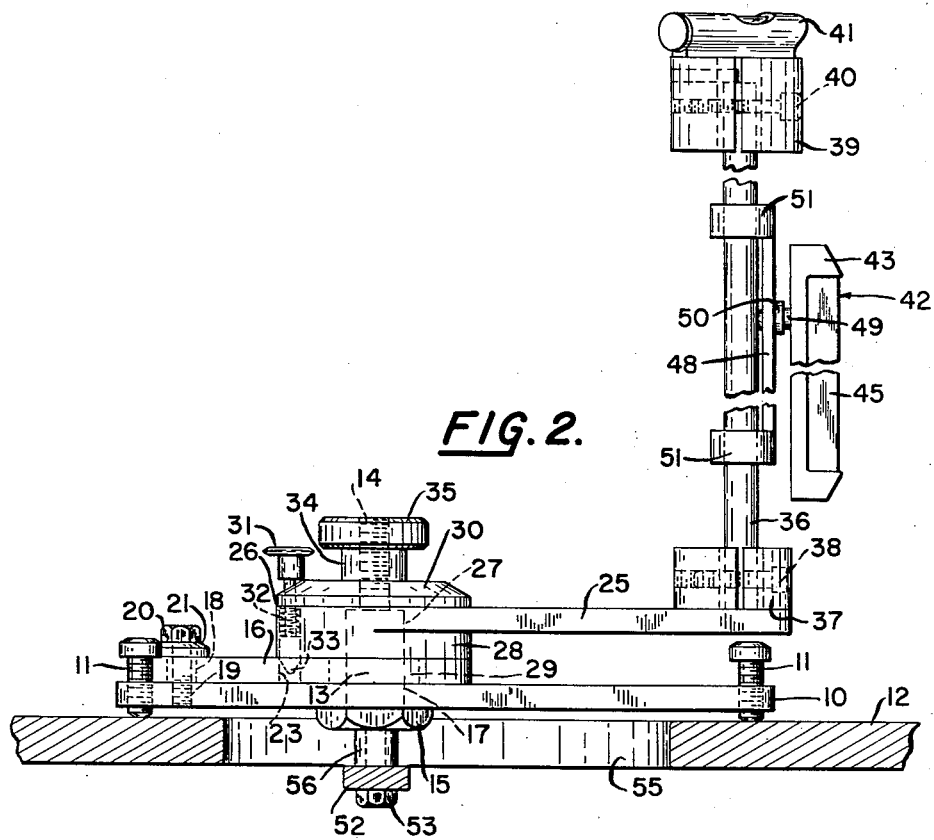
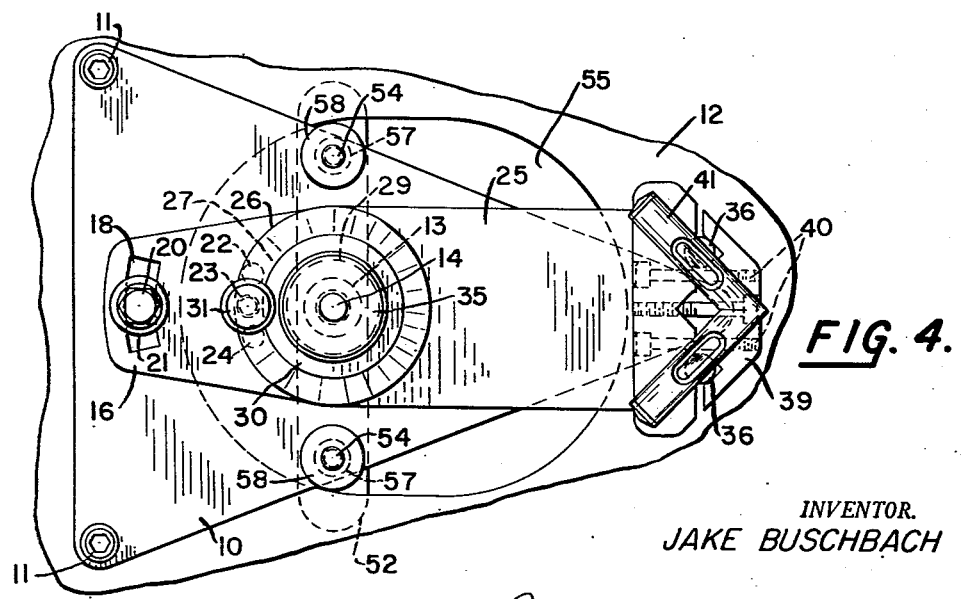
INVENTOR.
JAKE BUSCHBACH
BY Bertha L. MacGregor
ATTORNEY

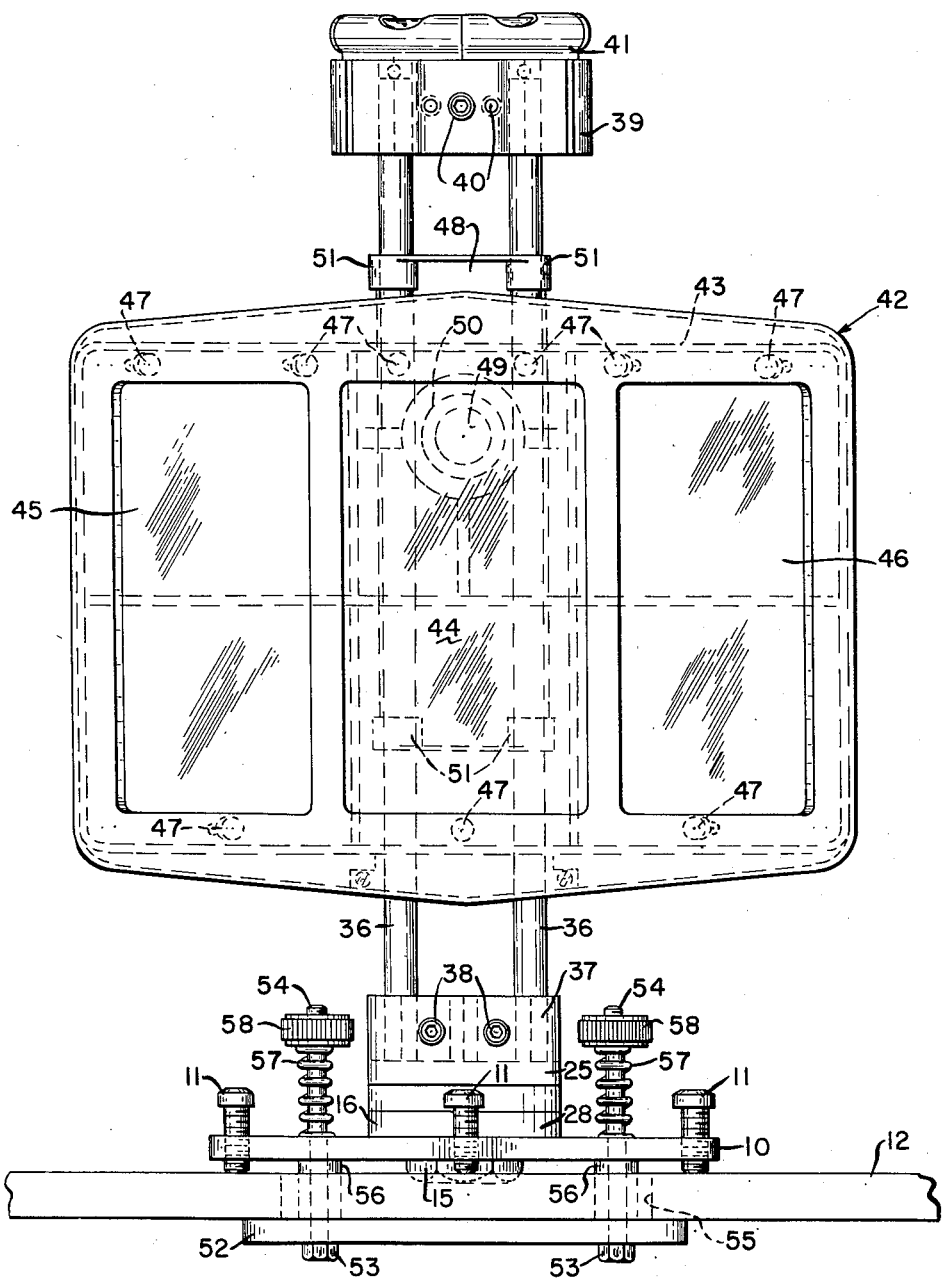

United States Patent Office 2,795,859
Patented June 18, 1957

2,795,859

APPARATUS FOR TESTING THE ACCURACY OF WHEEL ALIGNMENT MEASURING EQUIPMENT

Jake Buschbach, Denver, Colo.

Application January 24, 1955, Serial No. 483,529

18 Claims. (Cl. 33—203)

This invention relates to apparatus for testing the accuracy of wheel alignment measuring equipment, and particularly for testing the accuracy of function of mirrors and the like which are part of devices for optically checking or measuring alignment characteristics of motor vehicle wheels shown in U. S. Letters Patent Nos. 2,470,090 and 2,601,262. The alignment measuring or checking equipment shown and described in said patents includes a mirror unit mounted on the wheel to be tested, and employs the image of a light beam projected from a part of the equipment against said mirror and then to a screen for the purpose of measuring alignment characteristics of the wheel. A mirror mount which is part of such equipment is shown in U. S. Letters Patent No. 2,475,502.

In using the wheel alignment measuring equipment described in the aforementioned patents, I have found that the alignment or misalignment indicia projected by the light beam from the mirror to the screen may be inaccurate, and that the inaccuracy results from faulty disposition of the mirror relatively to the wheel being tested. As explained in said Patent No. 2,475,502, in order that the alignment checking process may be accurately performed, it is extremely important that the mirror mount be secured to the wheel being checked in a position which is parallel with the plane of the wheel. I have found, however, that although the mirror mount may be perfectly positioned on the wheel, the mirror may be improperly mounted in its frame or the frame may be distorted, and in either event the mirror will not be disposed in a plane parallel to the plane of the wheel on which the mirror unit is mounted, and therefore will not project accurately the condition of the wheel alignment.

Therefore the main object of my invention is to provide efficient and dependable apparatus for testing the accuracy of function of mirrors employed in wheel alignment measuring equipment of the character described in the patents mentioned herein.

Another object of my invention is to produce testing apparatus, for the purpose described, which is portable and designed for use at either side of the alignment measuring equipment.

Another object of the invention is to provide portable testing apparatus, for the purpose stated, which can be mounted on a part of the existing alignment measuring equipment now in use. Another object is to provide means for quickly and easily mounting my testing apparatus on the support, whereby the said existing alignment measuring equipment can be utilized to project on its screen the indicia reflected by the mirror unit to reveal the accuracy or inaccuracy of the mirror position and function.

The testing apparatus embodying my invention simulates a perfectly aligned wheel, that is, one in a true vertical plane. It includes means for mounting the mirror unit in parallel relationship to the support which simulates the perfectly aligned wheel. To insure that the apparatus shall at all times function as a wheel in perfect alignment, I have provided a plurality of adjustment means for the mirror support which are positive and dependable in operation.

The mirror unit shown and described in the aforementioned patents, now in use in wheel alignment checking equipment, comprises a rectangularly shaped center mirror and opposite side mirrors each of which is disposed at a twenty degree angle to the center mirror. This construction of the mirror unit is required for projecting the alignment characteristics of a wheel in "straight ahead" position and when turned to the right or left twenty degrees from said straight ahead position.

My testing apparatus therefore includes means for moving the mirror supporting mechanism from its center position, wherein the plane of the center mirror is parallel to the plane of the support which simulates a perfectly aligned wheel, to a position twenty degrees to either right or left, in order to place one or the other of said side mirrors in a plane parallel to the support.

The advantages and objects of this invention will be apparent from the drawings and the following specification.

In the drawings:

Fig. 2 is an elevational side view of the said apparatus with a mirror unit mounted thereon.

Fig. 3 is an elevational rear view of my apparatus with the mirror unit mounted thereon.

Fig. 4 is a top plan view of the apparatus shown in Fig. 1.

Figure 1:
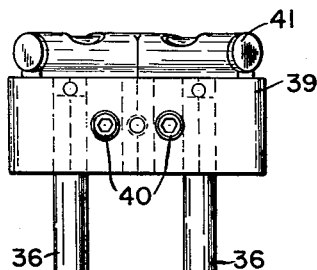
Fig. 1 is a front elevational view of apparatus embodying the preferred form of my invention for testing the accuracy of wheel alignment measuring equipment.

In the preferred embodiment of my invention shown in the drawings, 10 indicates a triangularly shaped flat metal base provided with three threaded apertures which extend vertically through the base for the reception of threaded adjustment bolts 11 located near each of the three corners of the base 10. The bolts 11 are used to adjust the flat base 10 to true horizontal position when the testing apparatus rests on the support 12 which is a part of the wheel alignment checking equipment disclosed in the aforementioned U. S. Patents Nos. 2,470,090 and 2,601,262. The base 10 is bored near its center and has fixedly mounted therein a stud or bolt which has a smooth cylindrical body 13 press fitted into said bore, and a threaded upper end 14 smaller in diameter than the body 13. Integral with the lower end of the stud body 13 is a hex head 15 which bears against the bottom surface of the base 10.

Figure 5:
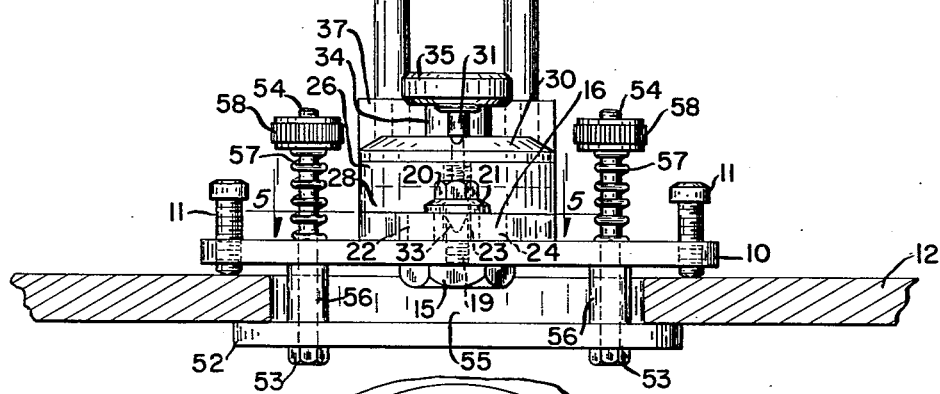
Fig. 5 is a horizontal sectional view, on an enlarged scale, in the plane of the line 5—5 of Fig. 1, looking downwardly as indicated by the arrows.

A flat smooth steel plate 16, shown on an enlarged scale in Fig. 5, rests loosely on the base 10. The plate 16 is provided with a round hole 17 through which projects upwardly the cylindrical body 13 of the stud, the hole 17 being of larger diameter than the body 13, so there is an annular space between the stud body 13 and the plate 16. The plate 16 has an arcuate slot 18 cut therethrough near its forward end, and a threaded bolt 19 extends through the slot and is threaded into the base 10. A nut 20 on the upper end of the bolt 19 bears on a washer 21 which surrounds the bolt and rests on the plate 16 adjacent the edges of the slot 18. When the nut 20 is tightened on the washer 21, the plate 16 is held in fixed position on the base 10, and when the nut 20 is loosened, the plate 16 can be moved on the base to the extent permitted by the bolt 19 in slot 18 for a purpose to be explained hereinafter.

Between the hole 17 and the slot 18, said plate 16 is provided with three round holes 22, 23, 24, located in the arc of a circle which is concentric with the center of the stud 13. The holes 22, 23, 24 are spaced apart twenty degrees and cooperate with means hereinafter described for retaining a mirror support in said center position or in a position twenty degrees to the right or left of center.

A metal arm 25, pivotally mounted on the stud 13 which rises from the base 10 through said adjustment plate 16, comprises a flat plate parallel to the base 10 and the adjustment plate 16. The forward edge of the arm 25 is rounded as indicated at 26 and provided with a round hole located centrally in said forward portion. Said hole is shaped to receive the upper end 27 of a collar which has a circular flange 28 extending radially midway between said upper end 27 and the lower end 29 of the collar. The flange 28 is parallel with and securely fastened to the bottom surface of the pivoted arm 25, with the upper end 27 of the collar flush with the top surface of the arm 25 and the lower end 29 depending beyond the lower surfaces of the flange 28 and of the arm 25. The internal diameter of the collar 27—29 is such that it fits the cylindrical body 13 of the stud. Said depending portion 29 of the collar fits into the annular space between the margin of the hole in the adjustment plate 16 and the stud 13 therein.

On top of said forward rounded end of the arm 25 is a round plate 30 provided with a central opening smaller in diameter than the internal diameter of the collar 27—29, to receive the reduced portion 14 of the stud 13. As best shown in Fig. 2, a headed spring pressed bolt 31 extends through registering holes in the plate 30 and arm 25 for engagement of the lower end of the bolt with one of the holes 22, 23 or 24 of the adjustment plate 16. The coiled spring 32 on the reduced portion of the shank of the bolt 31 bears at its upper end against the plate 30 and at its lower end against the shoulder formed between the reduced portion of the shank and its unreduced lower cone shaped end 33.

It will be understood from the foregoing, that the arm 25, with the collar 27—29 fitted therein, is pivotally mounted on the stud 13, to rotate independently of the adjustment plate 16. The top plate 30 on the pivoted arm 25 is rotatable with said arm about the reduced portion 14 of the stud 13, and the whole arm assembly is held down on the adjustment plate 16 by a threaded nut 34 which engages the upper end 14 of the stud 13. A knurled enlarged cap portion 35 facilitates manipulation of the nut 34.

A vertically disposed mirror support is mounted on the free rearward end of the arm 25. Said support comprises a pair of smooth round rods 36 mounted at their lower ends in a block 37 on the arm 25. For manufacturing convenience, the block 37 is made in two parts which are milled on their proximate faces to form complemental grooves adapted to receive the lower ends of the rods 36, said two parts of the block being securely connected together, after the rods have been put into place, by countersunk bolts 38. The block 37 is firmly bolted to the top of the free end of the arm 25.

The upper ends of the vertical rods 36 are engaged by a block 39, generally triangular in shape, in plan view, and, like the block 37, is made in two parts which are milled on their proximate faces to form complemental grooves adapted to receive the upper ends of the rods 36. The two parts are connected together by countersunk bolts 40, which can be loosened by using a wrench, to permit removal of the block 39 from the upper ends of the rods 36 without, however, completely separating the two parts of the block.

On top of the block 39 there are mounted two liquid level gauges 41 of the "bubble" type, arranged at right angles to each other, preferably in a unitary structure.

In Figs. 2 and 3, I have shown mounted on the rods 36, a mirror unit to be tested for accuracy. The unit indicated as a whole at 42 comprises a frame 43 in which are mounted three mirrors, a center one 44 in a vertical plane parallel to the vertical plane of the rods 36, and side mirrors 45 and 46, respectively, each extending at a twenty degree angle to the mirror 44. As shown in the rear view, Fig. 3, the mirrors are held in the frame 43 by adjustable screws 47 which are intended to hold the mirrors in vertical planes in the frame.

The mirror unit is pivotally mounted on a support 48 by means of a stud 49 fixed in the hub 50 of the support, a thickened portion (not shown) of the mirror frame 43 pivotally engaging the stud 49. The support 48 is a vertical plate which has upper and lower pairs of collars 51 fastened thereto so as to project rearwardly of the plate in position to engage the rods 36 by being slipped over the upper ends of the rods when the block 39 has been removed. If the mirrors 44, 45, 46 are mounted properly in their frame, the plane of the center mirror will be parallel to the vertical plane of the rods 36, and the mirrors will be truly perpendicular when the unit has been mounted on the rods 36.

To mount the testing apparatus on the support 12, I have provided a hold-down assembly best shown in Figs. 1 and 3, which comprises a flat metal bar 52, a pair of headed bolts 53 which have long smooth shanks and threaded upper ends 54, inserted through the bar 52 from the bottom and extending upwardly through an opening 55 in the support 12, with the heads of the bolts bearing against the lower surface of the support 12. Spacer sleeves 56 surround the bolts 53 between the bar 52 and base 10. The bolts 53 extend through holes in the base 10, near opposite sides thereof. Surrounding the bolts 53 and bearing on the base 10 are coiled springs 57 which are held under compression by knurled nuts 58 on the threaded upper ends 54 of the bolts 53. Thus the base 10 is yieldingly mounted on the support 12, permitting adjustment of the bolts 11 to make the base level in a horizontal plane.

*Operation.*—As previously explained, the support 12 is a part of patented wheel alignment measuring equipment and is located under the vehicle wheel to be inspected when the equipment is being used for wheel alignment inspection.

The base 10 of my testing apparatus and parts mounted thereon are placed on the support 12 in such position that the rods 36 occupy space designed to be occupied by the mirror supporting rods normally mounted on the wheel being inspected. The rods must be perfectly perpendicular and for this purpose several adjustment means are provided in my testing apparatus.

Assume the adjustment plate 16 to be in its normal position on the base 10, with the bolt 19 midway between the ends of the slot 18 so that the longitudinal center of the plate 16 coincides with the longitudinal center of the base 10, and assume that the pivotally mounted arm 25 is positioned so that the spring pressed bolt 31 engages the middle hole 23 in the adjustment plate 16.

The upper block 39 is removed from the rods 36 by loosening the bolts 40 slightly to release the block from the rods, and the mirror 42 is mounted on the rods by slipping the collars 51 over the upper ends of said rods. The collars 51 frictionally engage the rods 36 and hold the mirror unit in the position shown, about midway between the upper and lower ends of the rods. The center mirror 44 will face the light beam projected by the wheel alignment measuring equipment heretofore described. The block 39 is replaced on the rods after the mirror unit has been positioned thereon, and then the base is adjusted to insure true level horizontal position by means of the three independently operable adjusting bolts 11, whereby the base may be raised or lowered until the gauges 41 register absolutely level position of the base.

Some adjustment of the plate 16 on the base 10 may be required to move the face of the mirror into right angle relationship to the projected light beam, and this can be achieved by loosening the bolt 19 in the slot 18 and moving the plate 16 relatively to the base 10. In its intended position, the mirror unit 42 when supported by my testing apparatus, occupies the same position it would occupy when functioning as part of the alignment measuring equipment mounted on a perfectly aligned wheel.

If the light beam projected on the center mirror 44 and falling on the screen of the alignment measuring equipment does not indicate a perfectly aligned wheel, then it is apparent that the mirror is not functioning accurately for its intended purpose. This may be due either to faulty mounting of the mirror in its frame or to distortion of the frame 43.

To test the accuracy of function of the side mirrors, the arm 25 is moved pivotally about the stud 13 to a position where the spring bolt 31 can engage either the hole 22 or 24 in the adjustment plate 16. In that position, the free end of the arm 25 has been swung twenty degrees to right or left of center, and one of the side mirrors faces the light beam projected by the alignment measuring equipment. The testing procedure is the same as described with respect to the center mirror. Swinging of the arm 25 twenty degrees to right or left of center and thereby exposing one of the side mirrors to the projected light beam simulates the turning of a vehicle wheel with the tripple mirror attached thereto, in the alignment checking procedure which utilizes the measuring equipment of the patents first herein mentioned.

My apparatus for testing the accuracy of function of mirrors such as described obviates an important objection to the use of existing alignment measuring equipment because, heretofore, no means have been available for determining whether the mirrors in use in the equipment were functioning accurately. In the event of mirror breakage, it has been necessary to substitute a new or repaired mirror unit obtainable from the manufacturer of the wheel alignment measuring equipment. By the use of my testing apparatus, service stations which operate wheel alignment measuring equipment employing light beam reflecting means such as described, can replace broken or faulty mirrors without delay and at low cost, and can immediately test the repaired unit for accuracy of function. The testing apparatus is also of great value for making periodic tests with respect to mirror units which appear to be without fault but which, nevertheless, may be imperfect because of frame distortion or misplacement of mirrors in the frame. The availability of this testing apparatus "on the job" results in substantial savings of valuable time and money in addition to increased efficiency of the alignment measuring equipment by avoiding unintentional use of faulty mirror equipment for checking alignment.

The construction of my apparatus is such that the desired predetermined relationship between the base 10 and rods 36 is maintained at all times. The parts intermediate the base and rods are made of finely machined steel and the construction of the pivotal connections between the base and the rod carrying arm 25 obviate possibility of any play between the parts which would affect the predetermined relationship between the base and the mirror supporting rods.

There has been illustrated and described the preferred embodiment of the invention, but it should be understood that the invention is not limited to the construction shown and described, for it will be obvious to those skilled in the art that changes and modifications may be made without departing from the invention in its broader aspects. It is, therefore, intended in the appended claims to cover all such changes and modifications as fall within the spirit and scope of the invention.

I claim:

1. Apparatus for testing the accuracy of function of mirrors and the like used in wheel alignment measuring equipment, comprising a base, a stud projecting upwardly from the base, an adjustment plate on the base, said plate having a hole therein through which the stud projects upwardly, an arm pivotally mounted on said stud and movable in a plane parallel to the base, a mirror support mounted on and extending vertically upwardly from the arm, means on the base for adjusting said base to horizontal level position, means on the adjustment plate and base holding the plate in selected position on the base, and cooperating means on the arm and adjustment plate retaining the arm in a selected position.

2. Apparatus for testing the accuracy of function of mirrors and the like used in wheel alignment measuring equipment, comprising a base, a stud projecting upwardly from the base, an adjustment plate on the base, said plate having a hole therein through which the stud projects upwardly, a plurality of holes in the adjustment plate arranged in the arc of a circle concentric with the axis of the stud, an arm pivotally mounted on said stud and movable in a plane parallel to the base, a mirror support mounted on and extending vertically upwardly from the arm, means on the base for adjusting said base to horizontal level position, means on the adjustment plate and base for holding the plate in selected position on the base, and means on the arm engaging one of said plurality of holes in the adjustment plate.

3. Apparatus for testing the accuracy of function of mirrors and the like used in wheel alignment measuring equipment, comprising a base, a stud projecting upwardly from the base, an adjustment plate on the base, said plate having a hole therein larger in diameter than the stud through which the stud projects upwardly, an arm pivotally mounted on the stud, a collar secured to the arm and surrounding the stud and extending into the hole in the adjustment plate, a mirror support mounted on and extending vertically upwardly from the arm, means on the base for adjusting said base to horizontal level position, means on the adjustment plate and base holding the plate in selected position on the base, and cooperating means on the arm and adjustment plate retaining the arm in a selected position.

4. Apparatus for testing the accuracy of function of mirrors and the like used in wheel alignment measuring equipment, comprising a base, a stud projecting upwardly from the base, an adjustment plate on the base, said plate having a hole therein through which the stud projects upwardly, an arm pivotally mounted on said stud and movable in a plane parallel to the base, a mirror support mounted on and extending vertically upwardly from the arm, a level gauge mounted on the mirror support, means on the base for adjusting said base to horizontal level position, means on the adjustment plate and base holding the plate in selected position on the base, and cooperating means on the arm and adjustment plate retaining the arm in a selected position.

5. Apparatus for testing the accuracy of function of mirrors and the like used in wheel alignment measuring equipment, comprising a base, a stud projecting upwardly from the base, an adjustment plate on the base, said plate having a hole therein larger in diameter than the stud through which the stud projects upwardly, an arm pivotally mounted on the stud, a collar secured to the arm and surrounding the stud and extending into the hole in the adjustment plate, a mirror support mounted on and extending vertically upwardly from the arm, a level gauge mounted on the mirror support, means on the base for adjusting said base to horizontal level position, means on the adjustment plate and base holding the plate in selected position on the base, and cooperating means on the arm and adjustment plate retaining the arm in a selected position.

6. Apparatus for testing the accuracy of function of mirrors and the like used in wheel alignment measuring equipment, comprising a base, a stud projecting upwardly from the base, an adjustment plate on the base, said plate having a hole therein through which the stud projects upwardly, an arm pivotally mounted on said stud and movable in a plane parallel to the base, a mirror support mounted on and extending vertically upwardly from the arm, means on the base for adjusting said base to horizontal level position, means on the adjustment plate and base holding the plate in selected position on the base, cooperating means on the arm and adjustment plate retaining the arm in a selected position, and means for mounting the base on a support, said means comprising a bar adapted to engage the support, spacer sleeves on the bar, a pair of headed bolts extending upwardly through the bar, said sleeves and holes in opposite sides of the base, coiled springs on the bolts above the base and spring compressing nuts on the ends of the bolts.

7. The apparatus defined by claim 1, in which the mirror support comprises a pair of spaced apart parallel rods.

8. The apparatus defined by claim 3, in which the mirror support comprises a pair of spaced apart parallel rods.

9. The apparatus defined by claim 4, in which the mirror support comprises a pair of spaced apart parallel rods and a member removably mounted on the upper ends of the rods on which said level gauge is mounted.

10. The apparatus defined by claim 5, in which the mirror support comprises a pair of spaced apart parallel rods and a member removably mounted on the upper ends of the rods on which said level gauge is mounted.

11. The apparatus defined by claim 1, in which the base is triangular in shape and the means for adjusting said base to horizontal level position comprises three screw bolts, one extending through the base near each of its corners and bearing on a support.

12. The apparatus defined by claim 1, in which the means on the adjustment plate and base holding the plate in selected position on the base comprises an arcuate slot in the adjustment plate, a bolt extending through the slot into the base, and a nut on the bolt bearing on the plate adjacent said slot.

13. The apparatus defined by claim 1, in which the cooperating means on the arm and adjustment plate retaining the arm in a selected position comprises a spring pressed bolt extending through the arm and a plurality of holes in the adjustment plate arranged in the arc of a circle concentric with the axis of the stud, the said spring pressed bolt being adapted to engage a selected one of said holes.

14. The apparatus defined by claim 3, in which the means on the adjustment plate and base holding the plate in selected position on the base comprises an arcuate slot in the adjustment plate, a bolt extending through the slot into the base, and a nut on the bolt bearing on the plate adjacent said slot.

15. The apparatus defined by claim 3, in which the cooperating means on the arm and adjustment plate retaining the arm in a selected position comprises a spring pressed bolt extending through the arm and a plurality of holes in the adjustment plate arranged in the arc of a circle concentric with the axis of the stud, the said spring pressed bolt being adapted to engage a selected one of said holes.

16. Apparatus for testing the accuracy of function of mirrors and the like used in wheel alignment measuring equipment, comprising a base, a stud projecting upwardly from the base, a reduced threaded portion at the upper end of the stud, an adjustment plate on the base, said plate having a hole therein through which the stud projects upwardly, an arm pivotally mounted on said stud and movable in a plane parallel to the base, a top plate having a central hole therein mounted on the arm with the reduced threaded end of the stud projecting upwardly beyond the plate, means on said projecting end of the stud bearing on said top plate, a mirror support comprising a pair of spaced apart rods mounted on and extending vertically upwardly from the arm, a removable block on the upper ends of the arms, a level gauge mounted on the block, means on the base for adjusting said base to horizontal level position, means on the adjustment plate and base holding the plate in selected position on the base, cooperating means extending through the arm and top plate into said adjustment plate for retaining the arm in a selected position relatively to the adjustment plate, and means yieldingly mounting the base on a support.

17. Apparatus for testing the accuracy of function of mirrors and the like used in wheel alignment measuring equipment, comprising a base, a stud projecting upwardly from the base, an arm pivotally mounted at its forward end on said stud and movable in a plane parallel to the base, a pair of parallel rods adapted to slidably support a mirror in a plane parallel to the axes of the rods mounted on and extending vertically upwardly from the free end of the arm, a block frictionally engaging and detachably connecting the upper ends of the rods, a level gauge mounted on the block, means on the base for adjusting said base to horizontal level position, and cooperating means on the arm and base retaining the pivoted arm in a selected position relatively to the base.

18. Apparatus for testing the accuracy of function of mirrors and the like use in wheel alignment measuring equipment, comprising a base, a stud projecting upwardly from the base, an arm pivotally mounted at its forward end on said stud and movable in a plane parallel to the base, a pair of parallel rods adapted to slidably support a mirror in a plane parallel to the axes of the rods mounted on and extending vertically upwardly from the free end of the arm, a block frictionally engaging and detachably connecting the upper ends of the rods, a level gauge mounted on the block, means on the base for adjusting said base to horizontal level position, cooperating means on the arm and base retaining the pivoted arm in a selected position relatively to the base, and means for mounting the base on a support, said means comprising a bar adapted to engage the support, spacer sleeves on the bar, a pair of headed bolts extending upwardly through the bar, said sleeves and holes in opposite sides of the base, coiled springs on the bolts above the base and spring compressing nuts on the ends of the bolts.

References Cited in the file of this patent

UNITED STATES PATENTS

| | | |
|---|---|---|
| 20,915 | Young | July 13, 1858 |
| 216,759 | Randolph | June 24, 1879 |
| 817,991 | Ross | Apr. 17, 1906 |
| 879,122 | Saegmuller | Feb. 11, 1908 |
| 1,193,978 | Berger | Aug. 8, 1916 |